W. J. STEELE.
PLOW ATTACHMENT.
APPLICATION FILED OCT. 5, 1911.
1,040,049.
Patented Oct. 1, 1912.
2 SHEETS—SHEET 1.
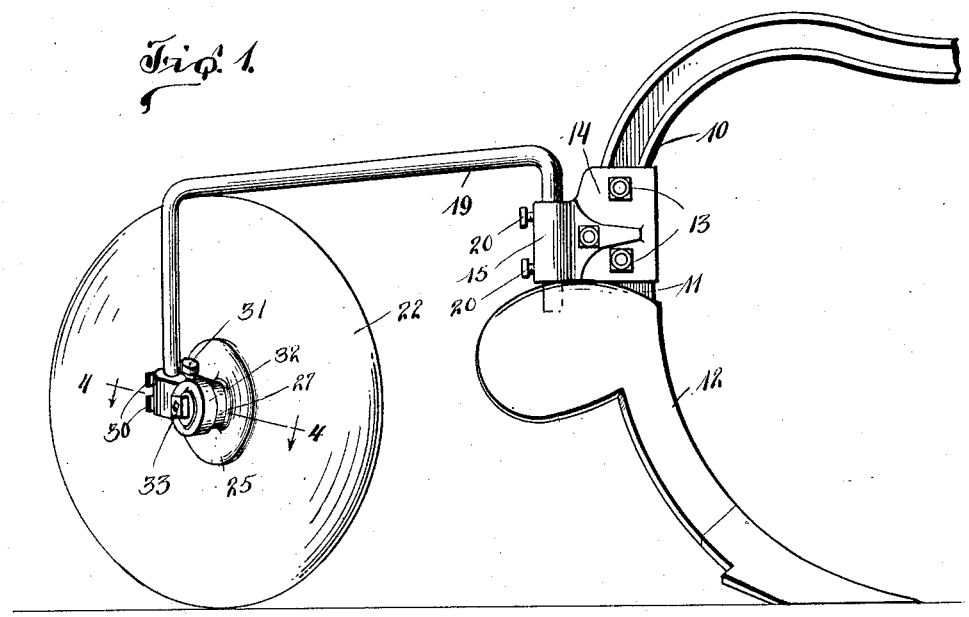
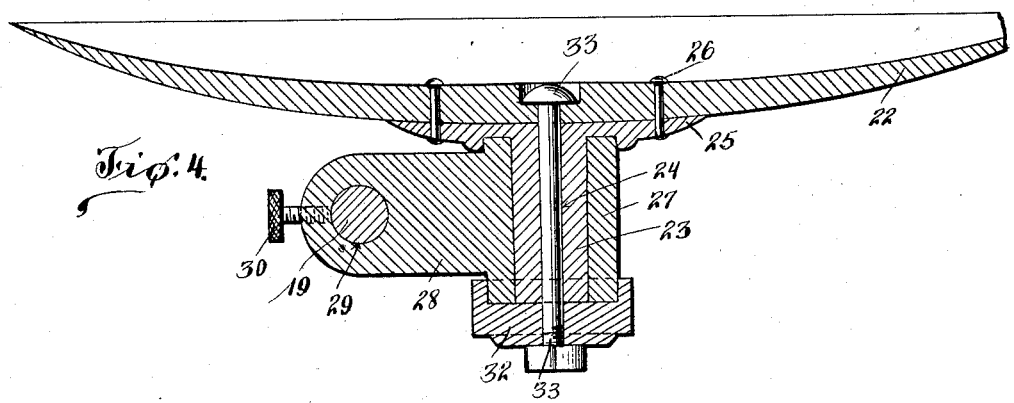
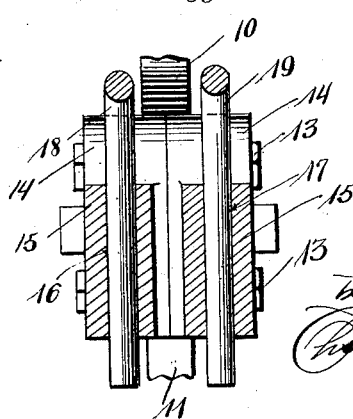
Witnesses
Inventor
W. J. Steele
Attorneys

W. J. STEELE.
PLOW ATTACHMENT.
APPLICATION FILED OCT. 5, 1911.

1,040,049.

Patented Oct. 1, 1912.

2 SHEETS—SHEET 2.

Inventor
W. J. Steele

Witnesses

UNITED STATES PATENT OFFICE.

WILLIAM J. STEELE, OF STERLING, KANSAS.

PLOW ATTACHMENT.

1,040,049.  Specification of Letters Patent.  Patented Oct. 1, 1912.

Application filed October 5, 1911. Serial No. 652,913.

*To all whom it may concern:*

Be it known that I, WILLIAM J. STEELE, a citizen of the United States, residing at Sterling, in the county of Rice, State of Kansas, have invented certain new and useful Improvements in Plow Attachments; and I do hereby declare the following to be a full, clear, and exact description of the invention, such as will enable others skilled in the art to which it appertains to make and use the same.

This invention relates to plow attachments and particularly to attachments for lister plows.

The object of the invention resides in the provision of an attachment of the character named which includes a pair of disks and means whereby said disks may be adjusted bodily toward and away from each other and also adjusted so as to be disposed at different angles to the longitudinal axis of the plow, said adjustments of the disk being resorted to in order to effect the return of the proper quantity of soil to the furrow formed by the plow share.

With the above and other objects in view the invention consists in the details of construction and in the arrangement and combination of parts to be hereinafter more fully described and particularly pointed out in the appended claim.

In describing the invention in detail, reference will be had to the accompanying drawings, wherein like characters of reference denote corresponding parts in the several views, and in which—

Figure 3:
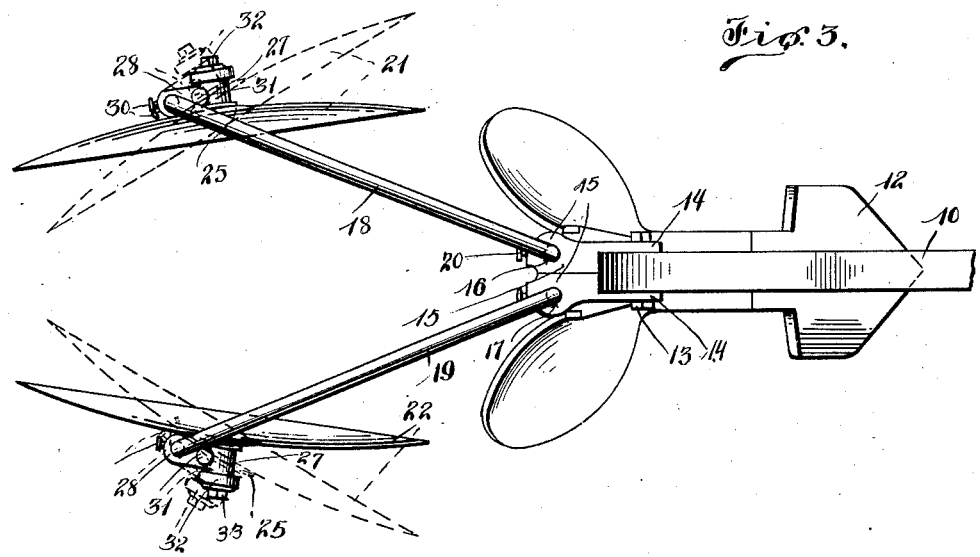
Figure 2:
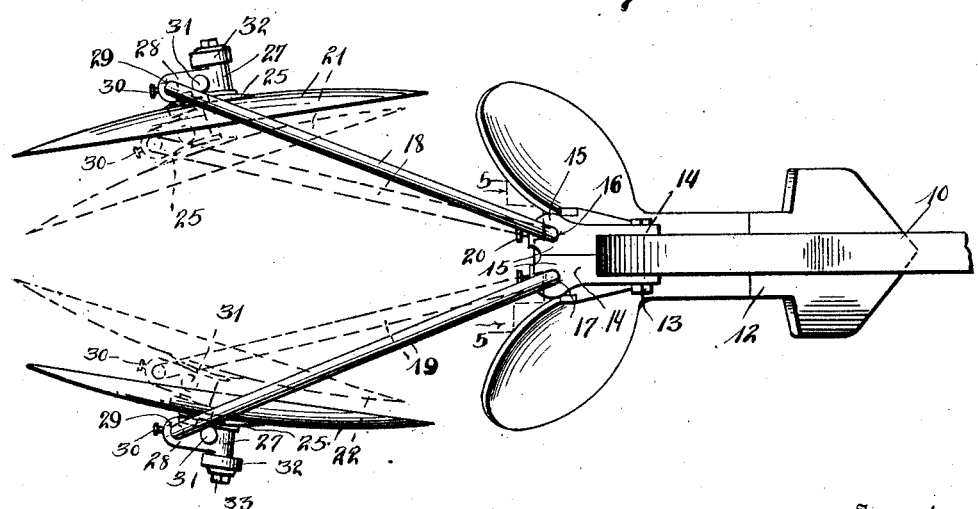

Figure 1 is a side elevation showing the attachment applied to a lister plow, Fig. 2, a plan view of what is shown in Fig. 1 with the attachment in full lines in one position and in dotted lines in an adjusted position, Fig. 3, a view similar to Fig. 1 showing the disks of the attachment in full lines disposed at a given angle to the longitudinal axis of the plow and in dotted lines adjusted to another angle to said axis, Fig. 4, a section on the line 4—4 of Fig. 1, and Fig. 5, a section on the line 5—5 of Fig. 2.

In the drawings there is shown an ordinary lister plow comprising a beam 10 the rear end of which is curved rearwardly and downwardly to form a standard 11 which latter has secured to its lower end a mold board 12. Mounted upon the standard 11 at the upper edge of the mold board 12 by means of bolts 13 are blocks 14 having rearward enlargements or extensions 15. These extensions 15 are provided with vertical openings 16 and 17 in which are mounted respectively corresponding arms of U-shaped brackets 18 and 19. These arms of said brackets are of a size to be rotatable for adjustment in the openings 16 and 17 whereby the free ends of the brackets may be swung toward and away from each other as desired. The arms of the brackets 18 and 19 which are disposed in the openings 16 and 17 are held against rotation when desired by set screws 20 mounted in the extension 15 and adapted to impinge, when manipulated, against the arms of the brackets.

The attachment further includes disks 21 and 22 carried respectively at the free ends of the brackets 18 and 19 respectively. Each of the disks 21 and 22 have secured thereto a laterally extending hub 23 having a longitudinal opening 24 therethrough. This hub 23 is provided with a lateral flange 25 which is directly secured to respective disks by means of bolts 26. Surrounding the hub 23 of each disk is a boxing 27 in which said hub rotates. This boxing 27 is provided with an extension or enlargement 28 provided with an opening 29 in which the outer arm of respective brackets 18 and 19 is disposed so as to permit adjustment of the boxing 27 upon said arm. In order to hold the boxing 27 against rotation on respective arms of the brackets 18 and 19 there are mounted in the extensions 28 set screws 30 which may be operated to impinge upon the arms of the brackets disposed in the openings 29. Mounted upon the boxing 27 so as to feed upon the hub 23 within said boxing is an oil cup 31. The boxing 27 is secured against lateral displacement of the hub 23 by means of a cap 32 secured against the outer end of said hub by a bolt 33 passing through the opening 24, said cap overlapping the adjacent end of the boxing 27.

By this construction it will be apparent that the brackets 18 and 19 can be adjusted toward and away from each other by swinging same on their inner ends which will result in the disks 21 and 22 being disposed nearer together or farther apart as the case may be. Again by rotating the boxings 27 on the outer arms of respective U-shaped brackets 18 and 19 the disks 21 and 22 may be adjusted to different angles with respect to the longitudinal axis of the plow and this last named adjustment of said disks together with their bodily adjustment previously mentioned will enable the plow to be regulated so that the proper quantity of soil will be returned to the furrow formed by the plow share.

What is claimed is:

The combination with a lister plow beam having a share secured thereto, of a bearing mounted upon said beam, a pair of inverted U-shaped brackets each having one arm adjustably mounted in said bearing, means for locking said brackets in adjusted position, a boxing adjustably mounted on the other arm of each bracket, means for locking said boxing in adjustment, and disks each provided with a hub journaled in said boxings respectively.

In testimony whereof, I affix my signature, in presence of two witnesses.

WILLIAM J. STEELE.

Witnesses:
HOBART JONES,
THOMAS ATKINSON.

Copies of this patent may be obtained for five cents each, by addressing the "Commissioner of Patents, Washington, D. C."